Figure 1:
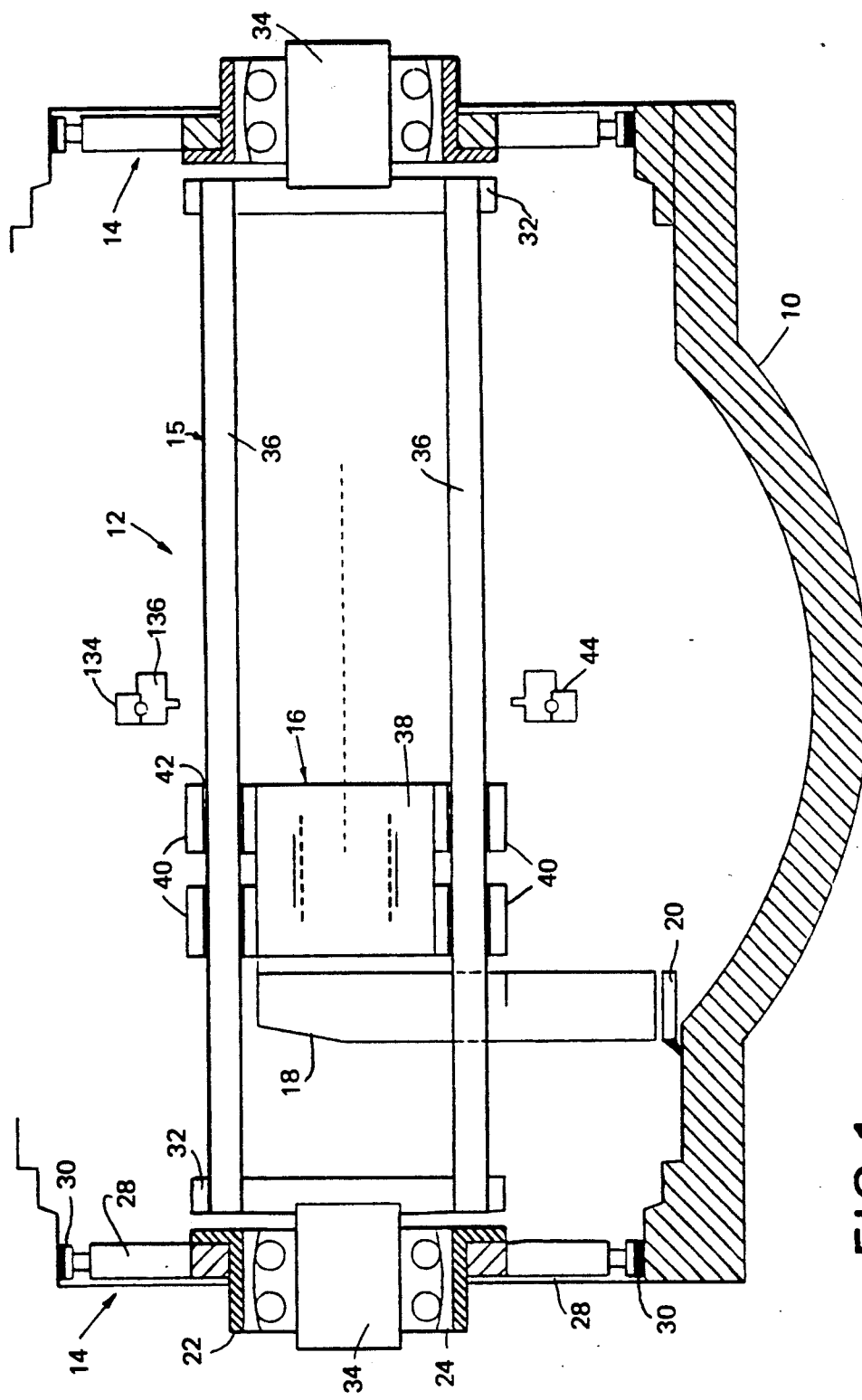

United States Patent [19]

Silk

[11] Patent Number: 5,183,365

[45] Date of Patent: Feb. 2, 1993

[54] BORING AND SURFACING MACHINE

[75] Inventor: George Silk, Nottinghamshire, England

[73] Assignee: Silk Engineering (Derby) Limited, Derby, England

[21] Appl. No.: 689,794

[22] PCT Filed: Nov. 24, 1989

[86] PCT No.: PCT/GB89/01412

§ 371 Date: May 24, 1991

§ 102(e) Date: May 24, 1991

[87] PCT Pub. No.: WO90/06201

PCT Pub. Date: Jun. 14, 1990

[30] Foreign Application Priority Data

Nov. 25, 1988 [GB] United Kingdom ............... 8827538

[51] Int. Cl.⁵ .................................... B23B 41/00
[52] U.S. Cl. ............................... 408/80; 408/181
[58] Field of Search ................. 82/1.2, 1.4; 408/54, 408/79, 80, 81, 101, 111, 131, 137, 138, 181

[56] References Cited

U.S. PATENT DOCUMENTS

| 807,755 | 12/1905 | Loyd | 408/81 |
|---|---|---|---|
| 1,973,386 | 9/1934 | Morgan | 82/1.4 |
| 3,383,957 | 5/1968 | McCann | 82/1.4 |
| 4,668,133 | 5/1987 | Campbell | 408/81 |
| 4,678,379 | 7/1987 | Sunday | 408/80 |
| 4,824,296 | 4/1989 | Strait | |
| 5,030,041 | 7/1991 | Marron | 408/80 |

FOREIGN PATENT DOCUMENTS

| 128747 | 3/1902 | Fed. Rep. of Germany | 408/81 |
|---|---|---|---|
| WO88/09705 | 12/1988 | PCT Int'l Appl. | |
| 2129350A | 5/1984 | United Kingdom | |

Primary Examiner—Daniel W. Howell
Attorney, Agent, or Firm—Oliff & Berridge

[57] ABSTRACT

A boring and surfacing machine (12) has a rotatable carriage (15) on which a tool carriage (16) is axially moveable. The tool carriage (16) supports a tool post (18). The tool carriage (16) and the tool post (18) can be driven axially and radially respectively, by means of lead screws (46) and (58). The rotatable carriage (15) can comprise two or more rails (36) enabling the dimensions of a work piece to be measured while the machine is in position and also to provide a relatively high moment of inertia.

22 Claims, 11 Drawing Sheets

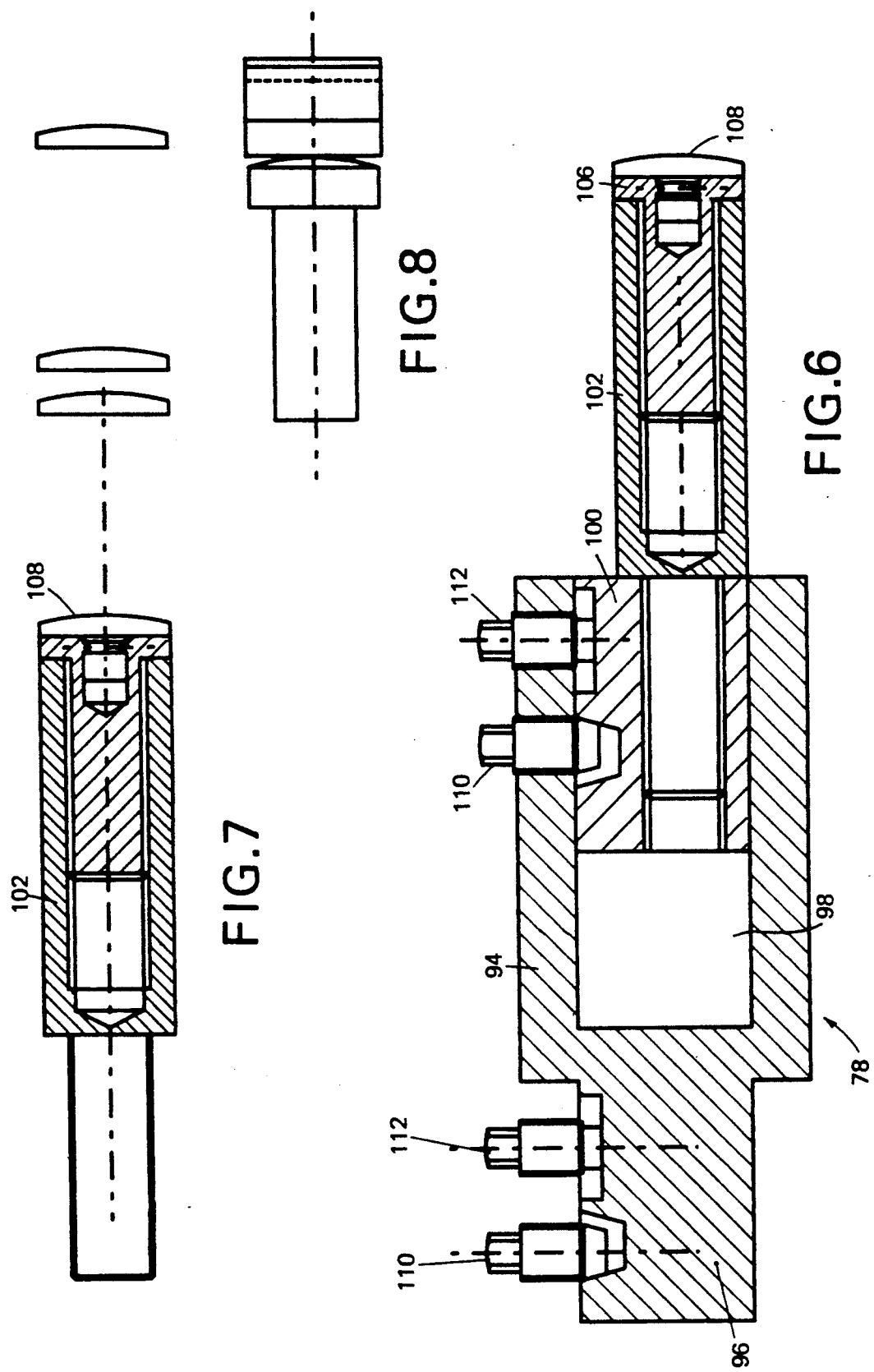

BORING AND SURFACING MACHINE

This invention relates to machine tools used for the cutting of internal diameters and surfaces of work pieces. Such machine tools are usually referred to as boring machines.

In particular, the present invention relates to a portable boring machine which can be used to machine work pieces on site.

Usually boring machines comprise a solid central shaft or arbor on which a tool post and cutting tool are mounted. The depth cut of a cutting tool is preset by appropriate adjustment of the tool post and the arbor is rotated and advanced into the work piece to cut a diameter.

A significant problem in such an arrangement is that it is impossible to make direct measurements of the cut diameter because of the arbor, and measurements of the cut diameter have to be made indirectly from the surface of the arbor which gives rise to errors in the calculation of the cut diameter.

Also, although in most cases the arbor is a solid shaft it is usually relatively small in diameter and therefore of low inertia which could assist in the machining operation.

Further, boring machines of the type described are relatively inflexible in that they are only capable of machining a limited range of diameters or other surfaces.

The present invention seeks to provide a boring machine, which enables a wide range of diameters and other surfaces to be cut internally of a work piece.

The present invention also seeks to provide a boring machine in which in some embodiments the dimensions of the work piece can be measured whilst the boring machine is in position.

Accordingly the present invention provides a machine tool comprising a carriage rotatably located on a mounting means, the mounting means enabling the machine tool to be positioned in and secured relative to a work piece, the rotatable carriage including a tool carriage mounted for axial movement on the rotatable carriage relative to the axis of rotation of the rotatable carriage, the tool carriage including a tool post mounted on the tool carriage, drive means to rotatably drive the rotatable carriage and to drive the tool carriage axially relative to the rotatable carriage, and to drive the tool post radially relative to the tool carriage, the tool post drive means comprising a drive transmission, and a power source located remotely from the tool post.

The present invention further provides a machine tool comprising a rotatable carriage, the carriage being rotatably located in mounting means at each end thereof, the mounting means enabling the carriage to be positioned in and secured relative to a work piece, a tool carriage mounted on the rotatable carriage for axial movement relative to the axis of rotation of the carriage, a tool post mounted on the tool carriage for radial movement relative to the axis of rotation of the carriage, and common drive means to rotatably drive the rotatable carriage and to drive the tool carriage axially and the tool post radially, the rotatable carriage including at least two arms extending between end supports, the end supports being rotatably located in the mounting means.

The rotatable carriage can include three or more arms which can be equi-spaced, extending between and secured to end plates at each end of the arms.

Preferably the rotatable carriage comprises four or six arms which can be equi-spaced, extending between end plates.

The tool carriage can comprise a central block including attachment arms, each including bearings enabling the tool carriage to move along the arms of the rotatable carriage.

The drive means for the rotatable carriage can comprise one or more fluid motors, which can be air or hydraulic motors, and an appropriate gear transmission to drive the rotatable carriage.

The drive means for the tool carriage can comprise a lead screw driven through an appropriate transmission from the drive means for the rotatable carriage.

The mounting means for the rotatable carriage can comprise a central hub in which is located a bearing arranged to receive a shaft attached to one end of the rotatable carriage, and a number of arms extending outwardly from the hub, the arms being variable in length and arranged to engage a surface of a work piece to be machined.

Figure 2:
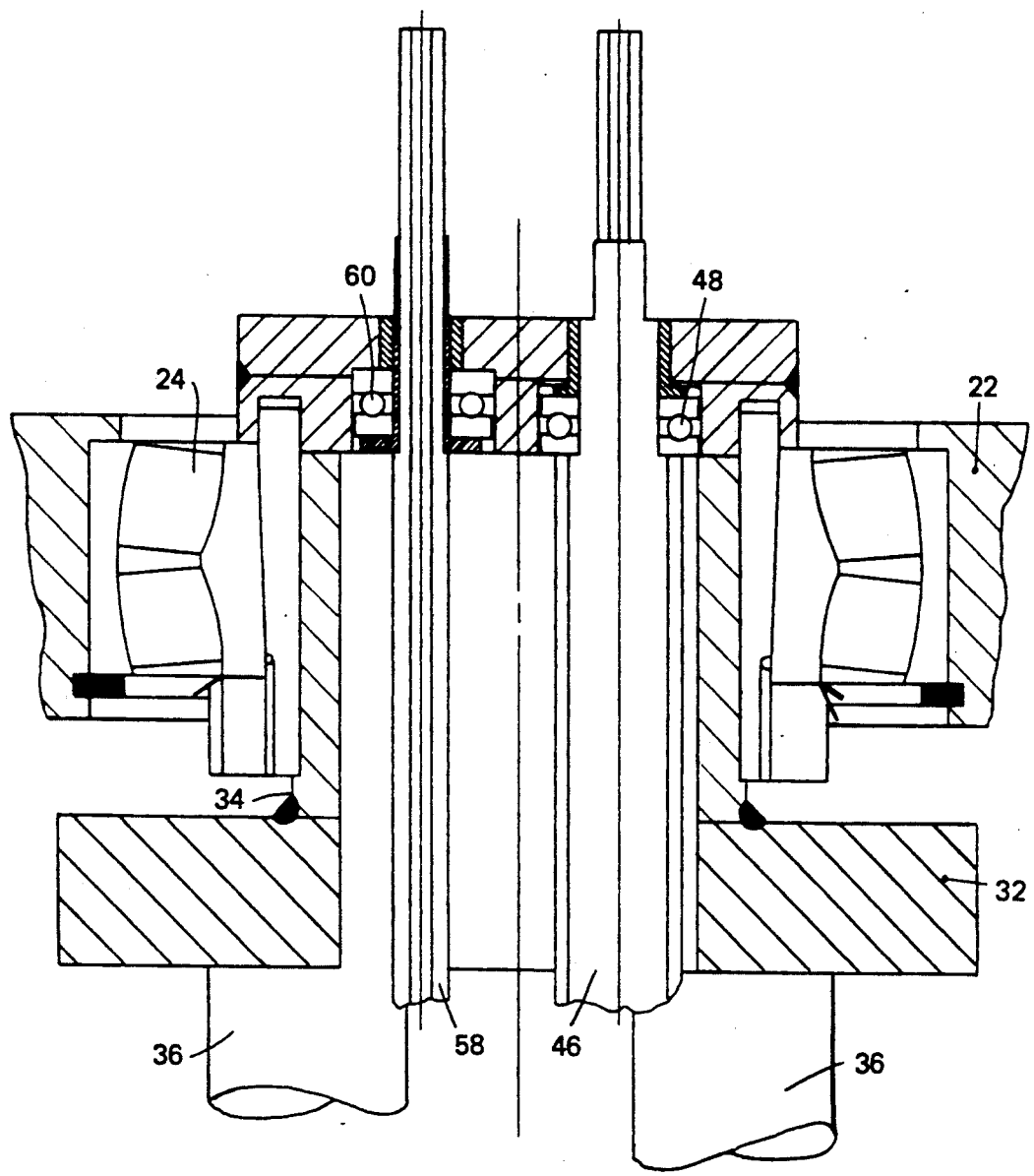
Figure 3:
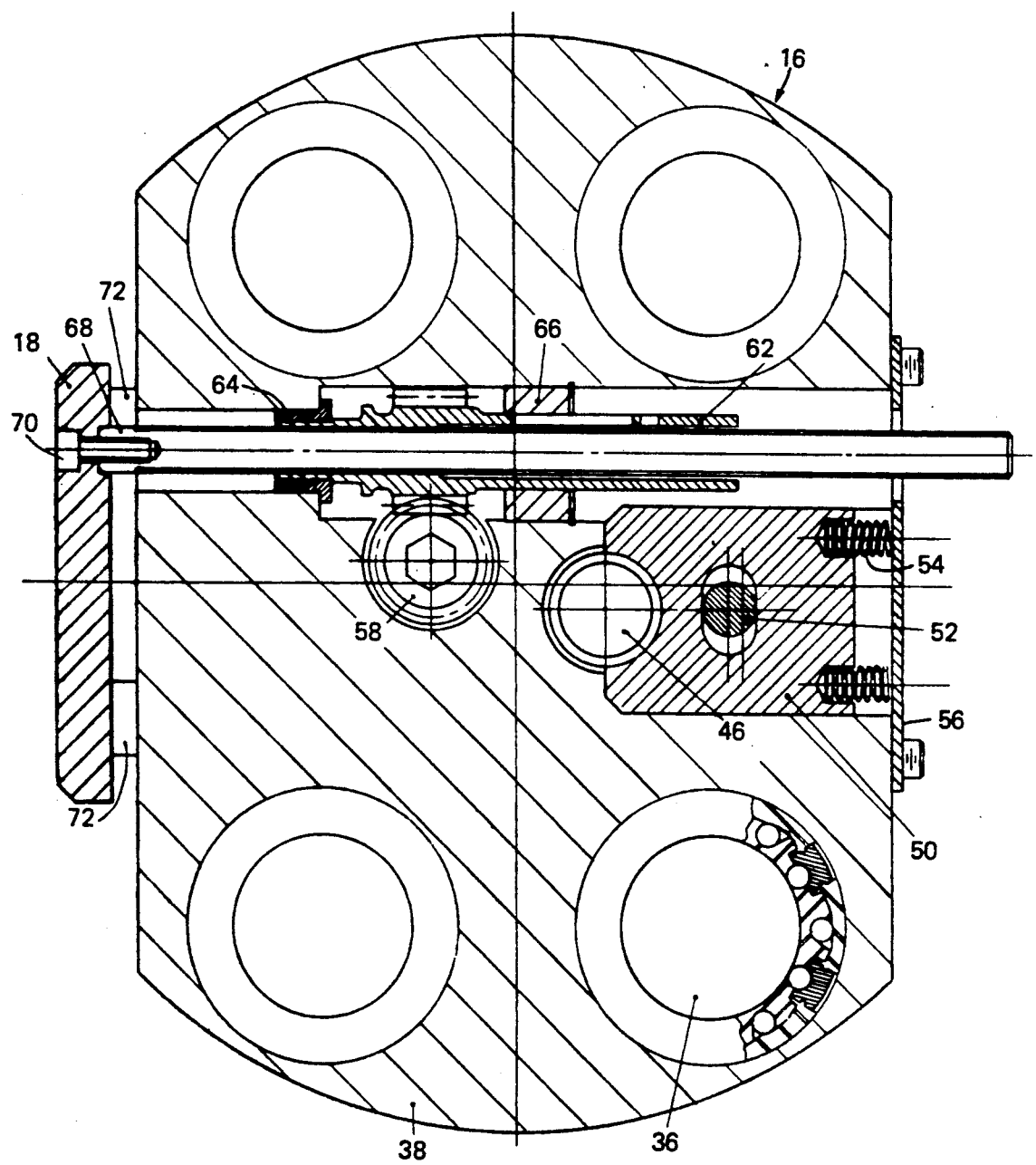
Figure 5:
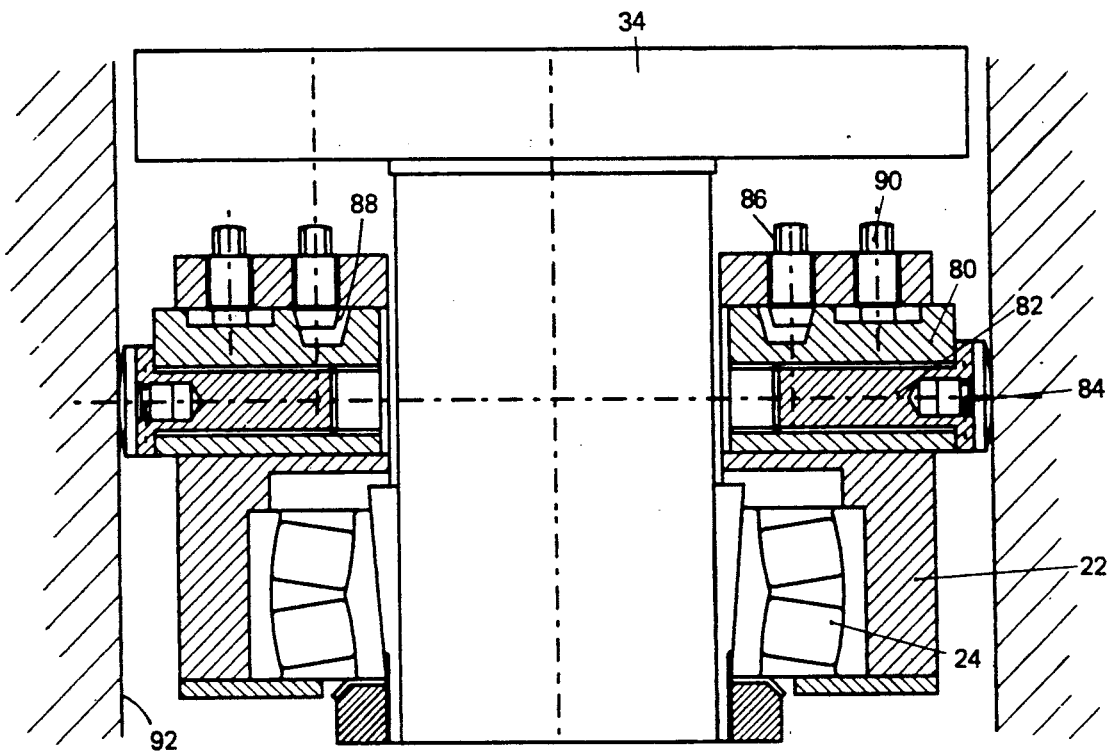
Figure 4:
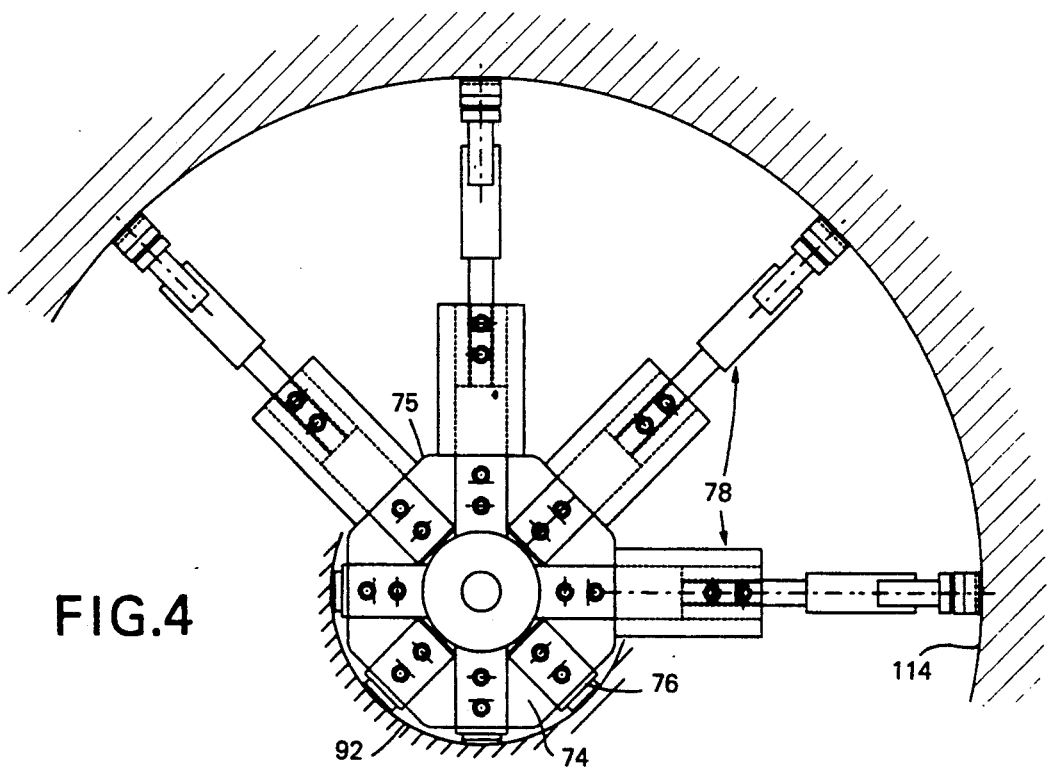
Figure 9:
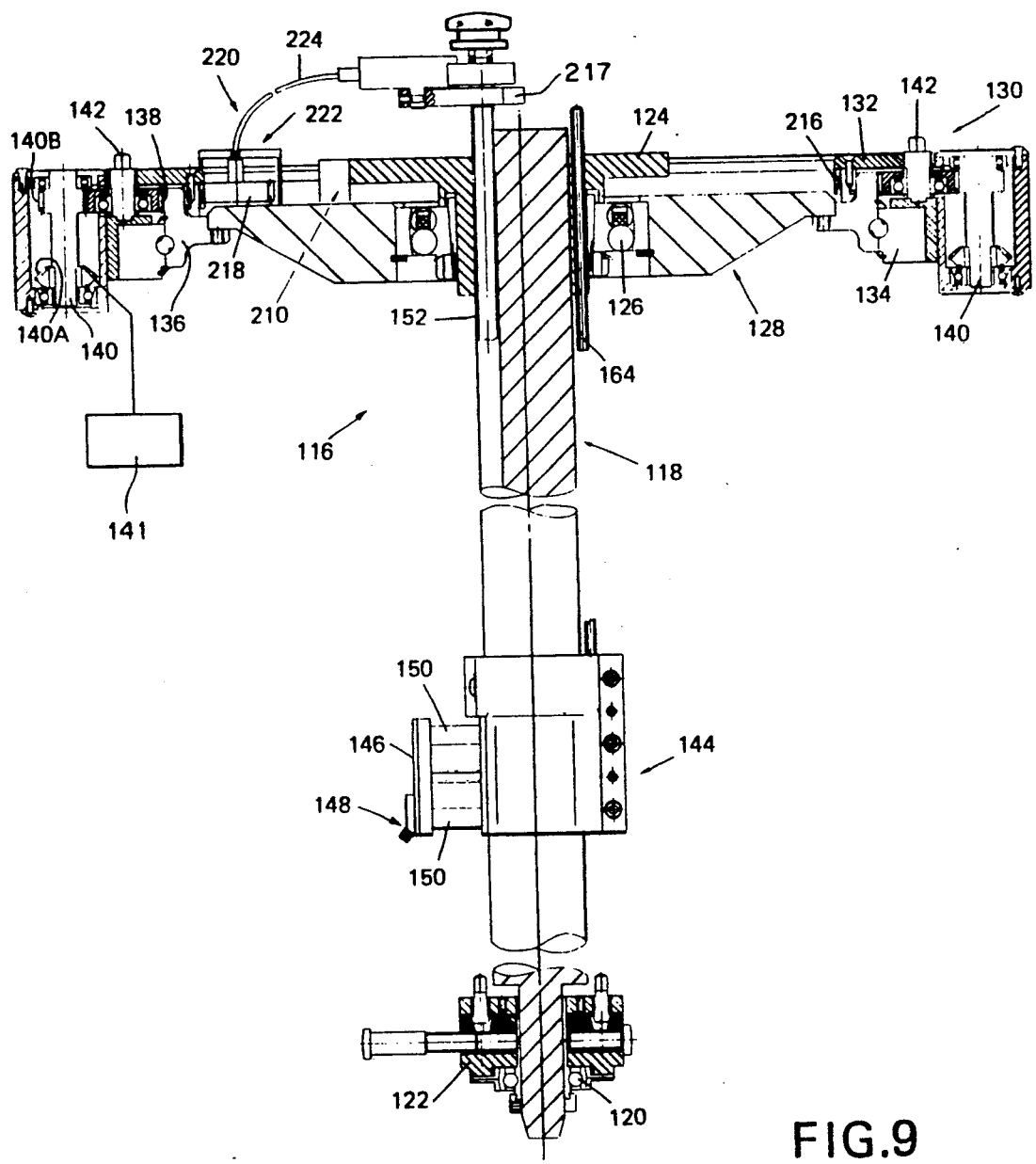
Figure 10:
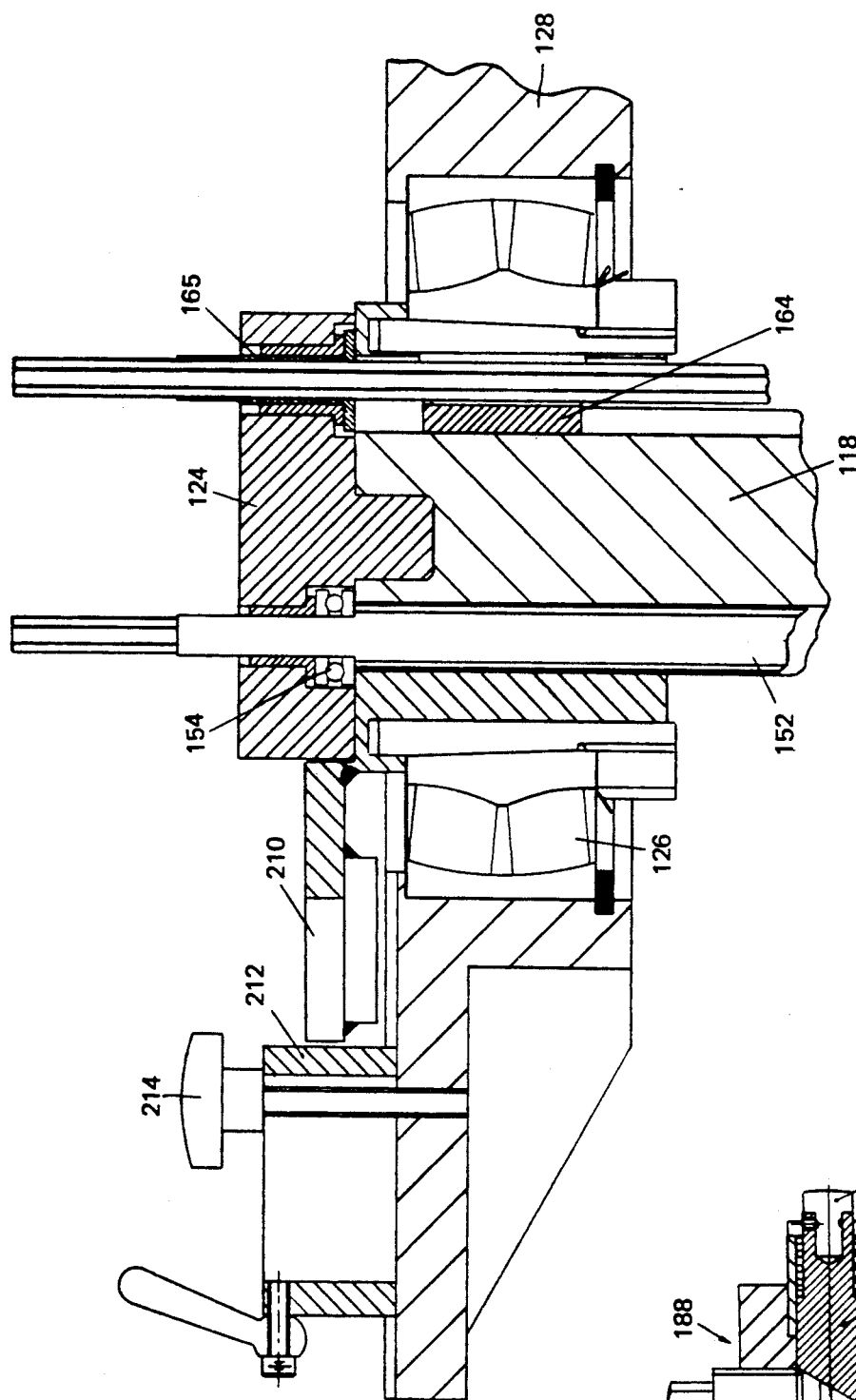
Figure 11:
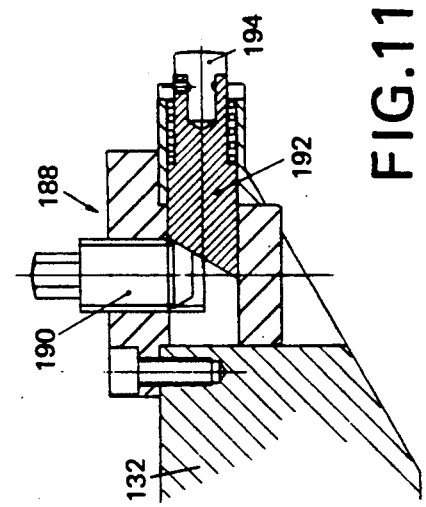
Figure 12:
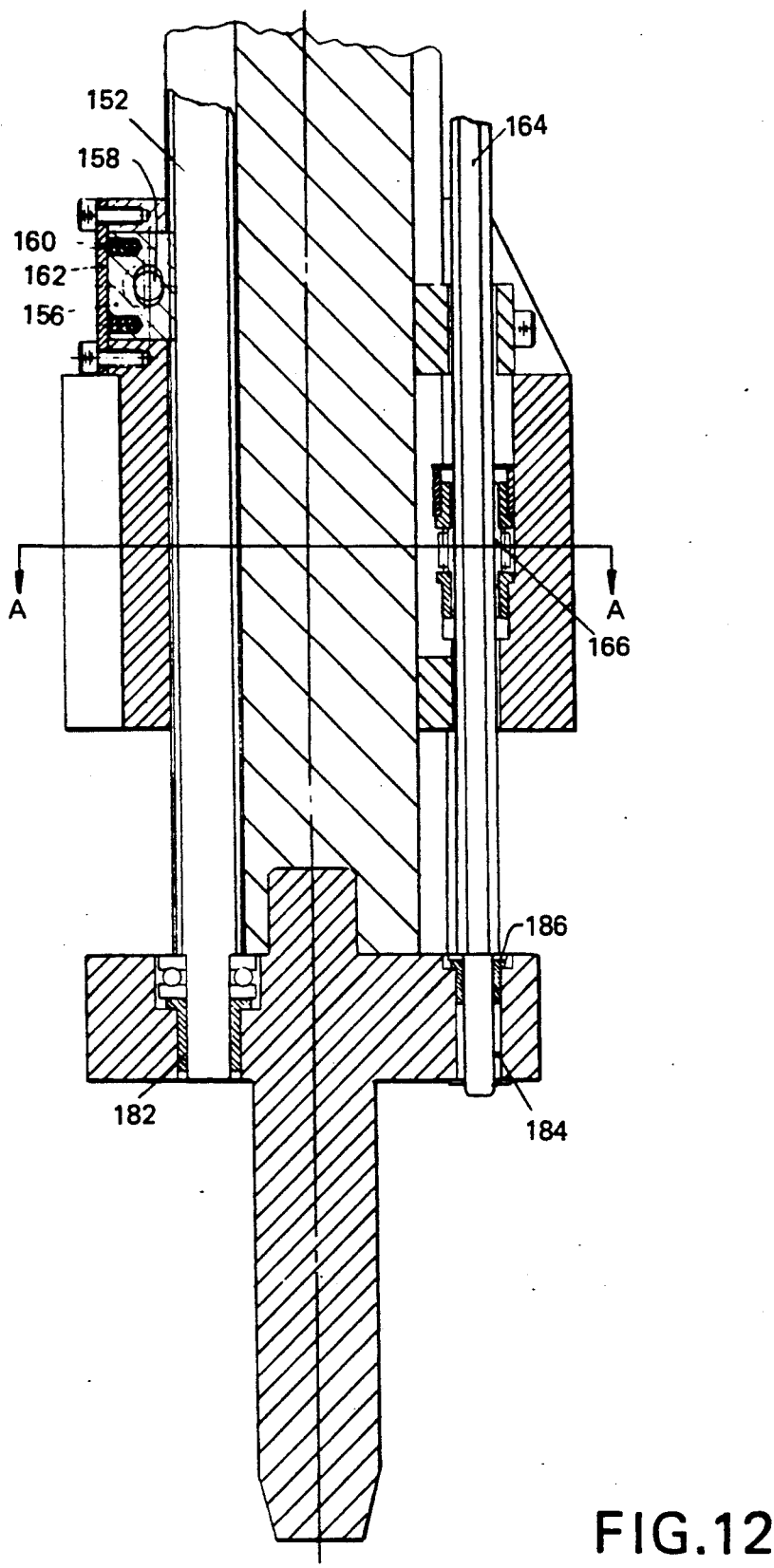
Figure 14:
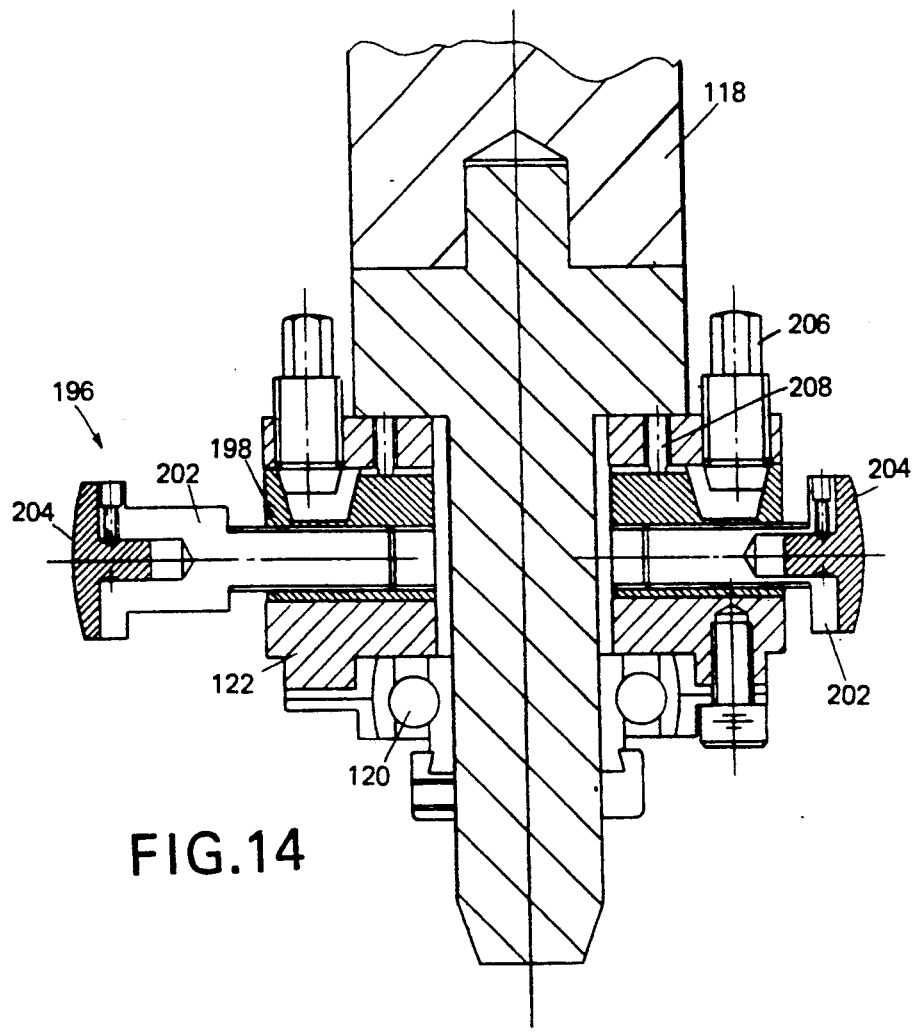
Figure 13:
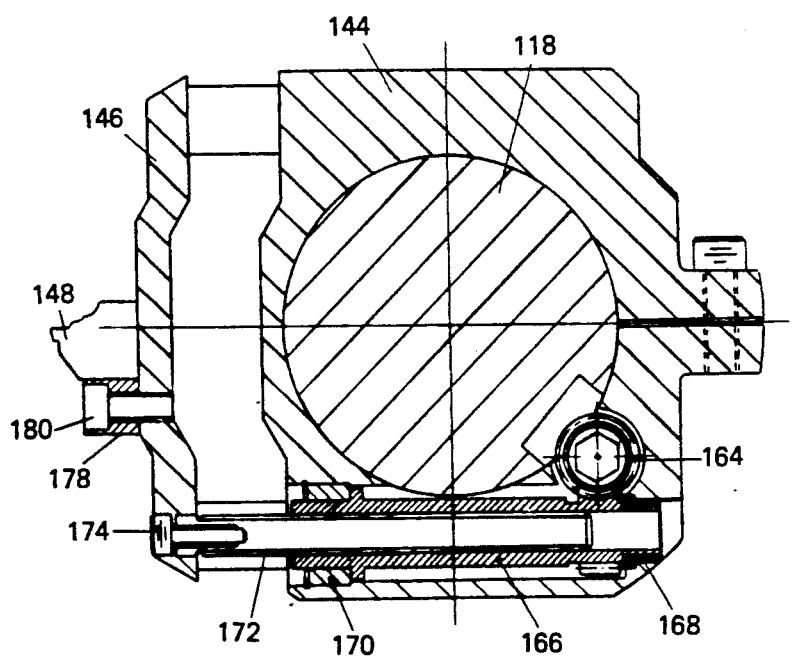
Figure 15:
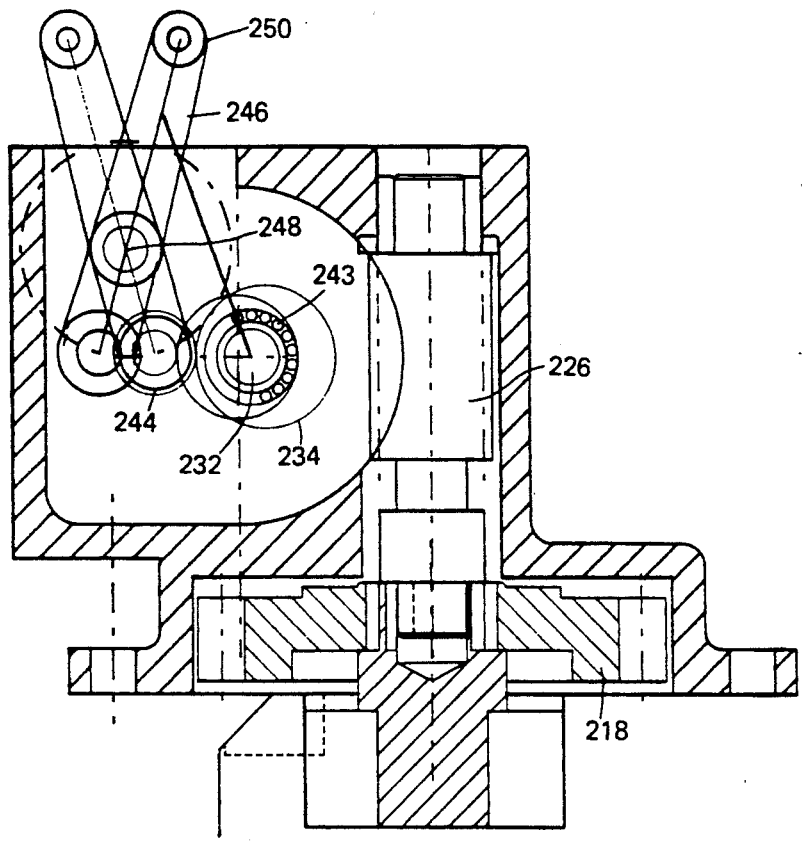
Figure 16:
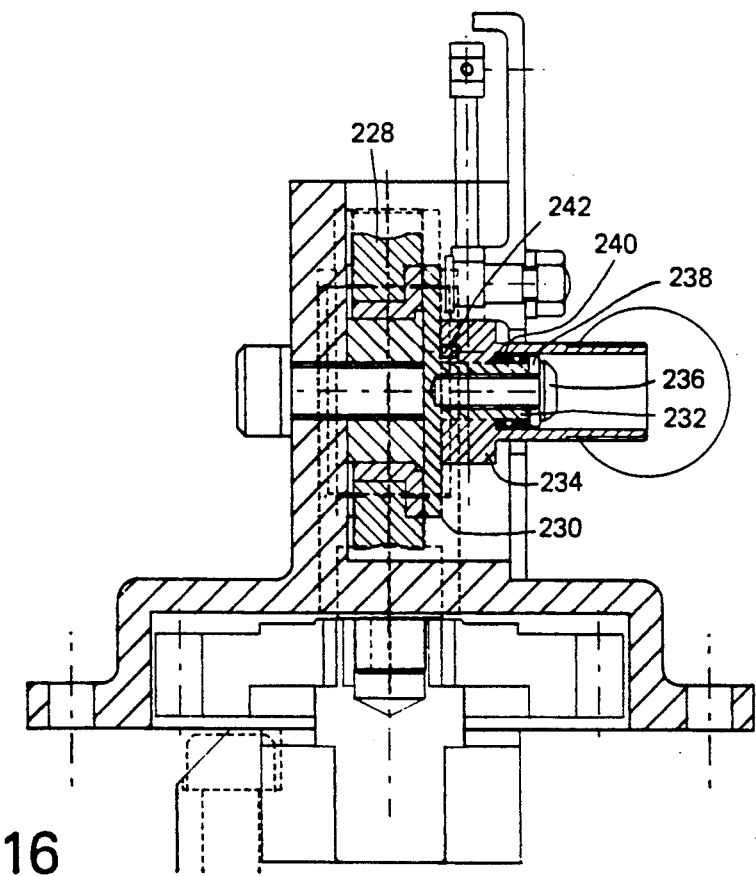
Figure 17:
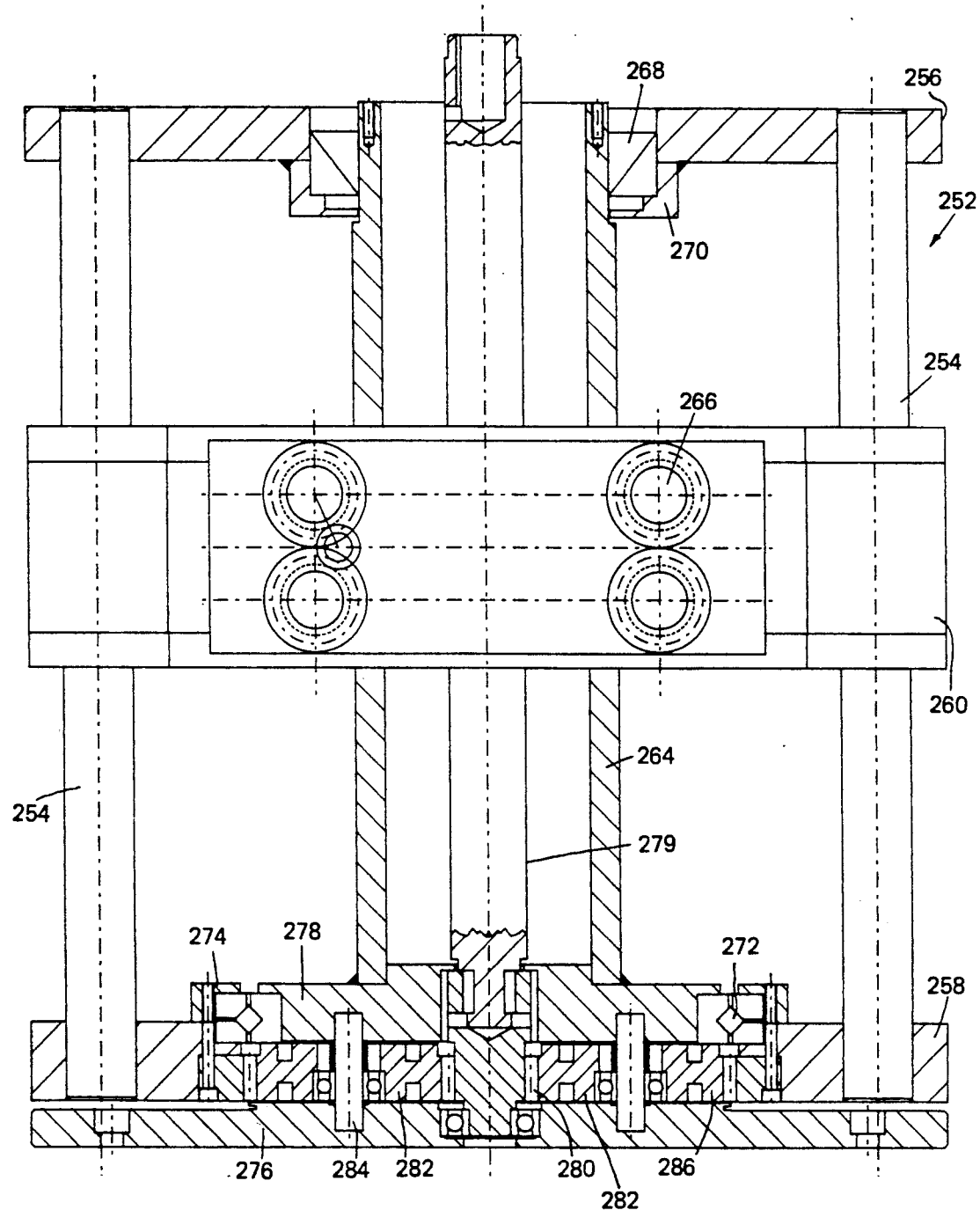

The present invention will now be more particularly described with reference to the accompanying drawings, in which:

FIG. 1 shows one form of boring machine according to the present invention secured within a work piece, FIG. 2 shows a suitable form of drive means for the tool carriage and tool post of the boring machine shown in FIG. 1, FIG. 3 shows a section through the tool carriage of the boring machine shown in FIG. 1, FIG. 4 shows a typical form of mounting structure for each end of the machine tool shown in FIG. 1, FIG. 5 is a detail of the mounting structure at one end of the boring machine shown in FIG. 1, FIG. 6 shows a detail of one of the arms of the mounting structure shown in FIGS. 4 & 5, FIGS. 7 & 8 show details of the arm shown in FIG. 6, FIG. 9 shows a further form of boring machine according to the present invention, FIG. 10 shows a detail of the drive means of the rotatable carriage of the boring machine shown in FIG. 9, FIG. 11 shows adjustment means for the boring machine shown in FIG. 9, FIG. 12 shows a detail of the tool carriage of the boring machine shown in FIG. 9, FIG. 13 is a section on line A—A in FIG. 12, FIG. 14 shows a detail of the mounting structure at one end of the boring machine shown in FIG. 9, FIG. 15 is a sectional elevation of the feed unit for either of the lead screws of the boring machine shown in FIG. 9, FIG. 16 is a side sectional elevation of the feed unit shown in FIG. 15, and FIG. 17 is a general arrangement of a further form of boring machine according to the present invention.

Referring to the drawings there is shown a part of a work piece 10 comprising a valve housing.

A boring machine 12 is located within and secured to the work piece 10 and comprises mounting means 14 at each end, a rotatable carriage 15 mounted in the mounting means 14, a tool carriage 16 which is axially moveable on the rotatable carriage 15, and a tool post 18 mounted on the tool carriage 16, a tool 20 being attached to the tool post.

Each mounting means 14 comprises a central hub 22, in which is located a spherical ball bearing 24. A number of arms 28 extend radially from the hub 22 and terminate in feet 30 which engage a diameter of the work piece 10. Each arm 28 is adjustable in length so as to position the boring machine correctly within the work piece.

The rotatable carriage comprises two end plates 32, each of which carries a stub-shaft 34 mounted in the bearing 24. Four equi-spaced arms 36 extend between and are secured to the end plates 32, each arm comprising a circular section shaft.

The tool carriage 16 comprises a central rectangular block 38 and eight attachment arms 40, two attachment arms for each shaft 36. Each attachment arm includes a bearing 42 enabling the tool carriage 16 to move easily along the shafts 36.

The tool post 18 is mounted on the central block 38 of the tool carriage 16, and includes means (not shown) enabling the depth of cut of the cutting tool 20 to be adjusted.

The rotatable carriage 15 is driven by drive means 44 only a part of which is shown but described in more detail with reference to the embodiment shown in FIG. 9. The drive means comprises one or more air motors each of which drives a pinion gear in engagement with an annulus gear secured to an appropriate location on the carriage 15.

The tool carriage 16 is driven along the length or part thereof the carriage 15 by means of a lead screw, shown in FIGS. 2 and 3, also driven through an appropriate gear transmission (see FIGS. 9, 15 and 16) by the or each air motor.

Drive means shown in FIGS. 2, 3, 9, 15 and 16 can also be provided for the tool 20 enabling the tool to be fed transversely of the direction of feed of the tool carriage 16.

In the example illustrated, it is required to machine an internal diameter D of the work piece 10. Initially the depth of cut is set by appropriate adjustment of the tool post 18. The drive means for the rotatable carriage and the axial feed for the tool carriage are activated causing the carriage 15 to rotate, and the tool 20 to be advanced along the carriage 15 thereby cutting the diameter D on the work piece.

Once the cut has been completed, the tool can be withdrawn by operation of the lead screw of the tool carriage 16.

It will be appreciated that the open structure of the rotatable carriage 15 enables an appropriate measuring instrument such as an internal micrometer, to be used to directly measure the machined diameter D since the micrometer will pass between the shafts 36 of the carriage 15 without obstruction.

It would also be appreciated that the major mass of the carriage 15 is located at relatively large radius as compared with the solid shaft or arbor of known boring machines, thereby providing a fly wheel effect because of the increased inertia which assists in the machining operations.

Also, the construction of the rotatable carriage and of the tool carriage provides a relatively very stiff structure to support the cutting operation, as the tool 20 is supported at a greater radius than would be the case with a solid boring bar.

Although not shown in FIG. 1, a drive can be provided on the tool post 18 enabling the tool 20 to be fed transversely to the feed direction of the tool carriage 16, so that as well as turning internal diameters, the machine tool can also be used for facing.

The drive for the tool carriage 16 and the drive for the tool post 18, and thus the tool 20, can be combined to both turn and face if required.

Whilst the carriage 15 has been illustrated using four shafts 36 to support the tool carriage 16, any number of such shafts can be used though it will be appreciated that the minimum number will be two and the maximum number will be limited, otherwise the advantages gained by an open structure enabling direct measurements to be taken, will be denied.

Any appropriate drive means can be provided for the rotable carriage, the tool carriage and the tool post.

Also, the mounting means for the rotatable carriage can be of any appropriate construction enabling the carriage to be correctly located and secured within a work piece.

Referring now particularly to FIGS. 2 and 3 in which the same reference numbers have been used to indicate corresponding components shown in FIG. 1, the boring machine 12 has a lead screw 46 mounting in bearings 48 in the hub 34 and engaging a nut 50 in the block 38 of the tool carriage 16. An eccentric feed nut engagement shaft 52 locates the nut 50 in position in the tool carriage block 38 and springs 54 together with a cover plate 56 secure the nut in position.

The boring machine 12 also has a lead screw 58 mounted in bearing 60 in the hub 34 which is arranged to drive the tool post 18 radially of the tool carriage. The lead screw 58 engages a rotatable worm gear shaft 62 which is secured against axial movement within the tool carriage by a bearing 64 and a cap 66. The worm gear shaft 62 has an internal thread in which is mounted a tool post lead screw 68 which is attach to tool post 18 by a screw 70. The tool post 18 is mounted on four bars 72 only two of which are shown, which extend into bores in the tool carriage block 38. The tool 20 is clamped to tool post 18 by a clamp bar (not shown).

The free ends of the lead screws 46 and 58 are formed as hexagonal bars so that the lead screws can be engaged by drive means described in more detail with reference to the embodiment of the invention shown in FIGS. 9 to 16.

Referring particularly to FIGS. 4 to 8. Typical mounting means 14 include hubs 74 and 75 at the ends of the boring machine from which extend a number of radial arms 76 and 78, to contact boxes 92 and 114 respectively.

Referring to FIGS. 4 and 5 which show the securing of one end of the boring machine in the relatively small diameter 92, each arm 76 comprises a cylindrical block 80 having a threaded bore in which is secured a foot 82 which can be moved inwardly or outwardly by rotation relative to the mounting block 80. Each foot 82 is terminated by a pad 84.

Each block 80 is provided with fine adjustment and clamping means comprising a threaded stud 86 which has a conical end engaging in a conical recess 88 in each block. A clamping screw 90 in the hub 22 can lock the block 80 in position once the fine adjustment has taken place.

In order to secure the end of the boring machine illustrated in FIG. 5 in position each foot 82 is adjusted so that the hub 34 can be inserted in the bore 92 of a work piece with a small clearance between the pads in the bore 92. The clamping screws 90 are released and the adjustment screws 86 are rotated so that the blocks 80 are moved radially outwardly and force the pads into engagement with the bore 92. Once sufficient clamping force has been applied the blocks 80 are secured in position by means of the clamping screws 90.

At the other end of the boring machine which may be secured in a much larger diameter the arms 78 are of a similar form and include a first inner portion 94 (see FIG. 6) having a stub end 96 which engages in a radial opening in the hub 75. The inner arm portion 94 has an opening 98 to receive a central arm portion 100 which is similar in construction to each block 80. The central arm portion 100 has a threaded bore in which is received an outer arm portion 102 also having a threaded bore in which is secured a foot 106 terminating in a pad 108.

Both the inner and central arm portions are provided with adjustment screws 110 and clamping screws 112 which function in the same manner as described with reference to the corresponding adjustment and clamping screws 86 and 90.

In order to clamp the boring machine within the larger diameter as illustrated in FIG. 4 both the further arm portion 102 and the foot 106 can be radially adjusted until there is a small clearance between the pads 108 and a bore 114. Either or both or the adjustment screws 110 can then be used to force the pads 108 into contact with the bore 114. Once sufficient clamping force is applied the clamping screws 112 are used to secure the portions of the arms in position.

Referring now to FIGS. 9 to 16 there is shown a boring machine 116 comprising an arbor 118 located in a bearing 120 in a hub 122 at one end and at the other end is secured to a hub 124 which is located in a bearing 126, itself located in a drive hub 128.

The drive hub 128 is located in a drive structure 130 which comprises a base plate 132 to which are attached an outer annular bearing ring 134, an inner annular bearing ring 136 having an annular gear 138, two input drive gears 140 and two pinion gears 142. The input drive gears 140 each comprise a bevel gear 140A and a pinion gear 140B, each beveled gear 140A being engaged by the output drive from fluid motor 141, which can be an air motor or a hydraulic motor.

A tool carriage 144 is mounted for axial movement on the arbor 118 and includes a tool post 146 having a cutting tool 148. The tool post 146 is mounted on four bars 150 which extend into corresponding bores in the tool carriage 144. The tool carriage and tool post are driven by lead screws which are shown more particularly in FIGS. 10, 12 and 13. Referring to these latter figures a tool carriage lead screw 152 extends through the hub 124 in bearings 154 at one end and engages a nut 156 which is located and secured in position in the tool carriage 144 by means of an eccentric feed nut engagement shaft 158, springs 160 and a retaining plate 162, this construction being similar to the corresponding construction illustrated in FIG. 3.

A tool post lead screw 164 also extends in bearings 165 through hub 124 and engages a worm gear shaft 166 which is secured against axial movement by a bearing 168 and a cap 170 (see FIG. 13). The worm gear shaft 166 is threaded internally and is engaged by a tool post lead screw 172 secured to the tool post 146 by a screw 174. The tool 148 is secured to the tool post 146 by a clamping bar 178 and screws 180. It will be appreciated that the drive for the tool post 146 is similar to that described with reference to FIG. 3.

The lower end of each lead screw 152 and 164 terminate in bearings 182 and 184 respectively in a hub 186. The upper ends of each lead screw 152 and 164 are hexagonal in section so that a drive described below can be attached to each of them selectively.

In order to secure the boring machine shown in FIG. 9 in position, the base plate 132 is provided with a number of jacking bolts 188 illustrated in FIG. 11. Each jacking bolt 188 comprises a screw 190 having a conical end which engages an inclined surface on a block 192 which terminates in a pad 194. It will be appreciated that by rotation of the screw 190 block 192 will be forced outwardly so that the pad 194 can be forced into contact with a bore of a work piece (not shown).

The other end of the boring machine can be secured in position by a number of adjustable arms 196 illustrated in FIG. 14. Each arm 196 comprises a block 198 located in a radial recess in the hub 122, the hub including the bearing 120 in which the lower end of the arbor 118 is located. A threaded foot 202 is secured in a threaded bore in each block 198 and terminates in a pad 204. Each block 198 is provided with an adjustment screw 206 and a clamping screw 208. The adjustment screws 206 and 208 and the radial arms 196 are constructed and function in a similar manner to the mounting means illustrated in FIGS. 4 to 8 respectively.

The drive means 130 for the arbor 118 includes a slot 210 (FIG. 9) provided in the hub 124 which is engaged by dog (FIG. 10) 212 on the drive hub 128. The dog 212 is secured in position by a clamp 214 which can be released so that the dog can move radially inwardly to engage the slot 210. The clamp 214 is then applied to secure the dog in position.

The drive for either of the lead screws 152, 164 comprises an annular ring gear 216 which is secured to the inner annular bearing 136 which engages a pinion 218 of a drive unit 220. The drive unit 220 includes a variable rate drive 222 illustrated in more detail in FIGS. 15 and 16 and includes a cable 224 which operates a sprag nut 217 which can engage either the lead screw 152 or 164, directly or indirectly. In FIG. 9 the drive unit is shown with the sprag nut 217 arranged to drive the lead screw 152.

Referring particularly to FIGS. 15 and 16 the variable rate drive 222 includes the input pinion 218 which drives a gear 226 which in turn drives a worm wheel 228. A cam mount 230 having a post 232 is attached to the worm wheel 228 so that the post is off centre with respect to the axis of rotation of the worm wheel. A circular cam 234 is mounted excentrically on the post 232 and is held in position by a bolt 236, washer 238 and spring 240. The cam 234 is secured in position with respect to the cam mount 230 by means of a peg 242 arranged to engage one of a number of bores 243 arranged on an arc of a circle in the base of the cam 234. It will be appreciated that by lifting the cam 234 against the spring load 240 the cam can be rotated on the post 232 to engage the peg 242 in a different bore 243, thereby altering the eccentricity of the cam with respect to the worm wheel.

A cam follower 244 is attached to one end of a lever 246 which is pivoted at 248 and the cable 224 is attached to the lever 246 at the end 250 opposite to the cam follower 244.

In operation, the machine illustrated in FIG. 9 is secured in position within a work piece using the mounting means described with reference to FIGS. 11 and 14. The air motors (not shown) are operated which drive the input shaft 140 which in turn drive pinions 142 and the inner annular bearing 136. With the dog 212 in position the arbor 118 will rotate with the drive hub 128 at the same time the pinion 218 of the feed unit 220 is driven by the annular gear 216. The tool carriage 144 is positioned axially along the arbor 118 by engaging the sprag nut 217 of the drive unit 220 on the hexagonal end of the lead screw 152. As the output from the drive unit 220 is intermittant the tool carriage 144 can be positioned by either manual operation of the lead screw 152 or by application of a motor drive so that the tool carriage can be rapidly moved into approximately the correct position. Similarly the tool post 148 can also be moved in position either manually or by using a motor drive engaging the hexagonal end of the lead screw 164. Once the tool carriage and tool post are correctly positioned the drive from the feed unit 220 can be applied to either of the lead screws 152 or 164 depending on whether the machine is to cut a diameter or to cut a surface.

It will be appreciated that the feed unit enables the cutting tool to be advanced axially or radially in a step like motion with varying increases in the depth of cut and that the rotation of either of the lead screws is in the form of steps at regular intervals.

Although only one feed unit for the drive shafts 152, 164 is shown two feed drive units could be provided so that if necessary both of the lead screws 152 and 164 could be operated so that a surface other than a bore or radial surface could be cut. It will be appreciated that the rate of advancement of each lead screw in such circumstances would have to be arranged so as to provide an acceptable finish to the machine surface.

Referring to FIG. 17 there is shown a further form of boring machine according to the present invention comprising a rotatable carriage 252 including six rails 254 attached to end plates 256 and 258. A tool carriage 260 is mounted for axial movement on the rails 254 and has four openings 266 for the support posts of a tool post (not shown). The rotatable carriage is mounted on a column 264 in bearings 268 in a hub 270 at one end, and bearings 272 in a hub 274 at the other end.

The machine includes a base plate 276 which is attached to a base 278 secured to the column 264.

A drive shaft 279 extends through the column 264 and a drive pinion 280 is attached to the lower end of the drive shaft 279. The pinion 280 engages two further gear wheels 282 which are mounted on shafts 284 extending between the base plate 276 and base 278. The gear wheels 282 engage an annular gear 286 which is attached to the end plate 258.

Lead screws to drive the tool carriage 260 axially along the rails 254 and to drive a tool post radially with respect to the tool carriage 260 are provided in a form similar to that described with reference to FIGS. 2 and 3. The drive for each of the lead screws can be in the form of the drive unit described with reference to FIG. 9.

In use the boring machine illustrated in FIG. 17 is clamped to a work piece or to a suitable piece of stationary structure using the base plate 276. The drive shaft 279 is driven by any suitable drive motor, for example one or more air motors, and rotation of the drive pinion 280 will rotate the gears 282 which in turn rotate the end plate 258 thereby rotating the carriage 260. The drive for the tool carriage and the tool post can then be selectively engaged to cut a diameter or a radial surface of a work piece (not shown).

I claim:

1. A machine tool comprising a rotatable carriage rotatably located on mounting means, the mounting means enabling the machine tool to be positioned and secured relative to a work piece, the rotatable carriage supporting a tool carriage mounted for axial movement on the rotatable carriage relative to the axis of rotation of the rotatable carriage and a tool post mounted on the tool carriage for radial movement relative to the tool carriage, drive means for rotatably driving the rotatable carriage and for driving the tool carriage axially relative to the rotatable carriage, and for driving the tool post radially relative to the tool carriage, wherein the drive means for driving the tool post comprises a power source located remotely from the tool post and a tool post drive transmission coupling the power source to the tool post and including a drive lead screw coupled to the power source and engaging a worm gear having an internal thread engaging a tool post lead screw attached to the tool post.

2. A machine tool as claimed in claim 1 wherein the drive means for axially driving the tool carriage comprises a tool carriage drive transmission including a lead screw engaging a nut secured in the tool carriage, the tool carriage drive transmission coupled to the power source located remotely from the tool carriage.

3. A machine tool as claimed in claim 2 wherein the drive means for the tool carriage and the tool post include a variable rate drive.

4. A machine tool as claimed in claim 3 wherein the variable rate drive includes a worm wheel driven by the power source and a cam driven by the rotation of the worm wheel, a follower urged into contact with the cam, the follower operating an intermittent output drive selectively coupled to one of the tool carriage and the tool post.

5. A machine tool as claimed in claim 4 wherein the cam is located on and secured eccentrically on mounting means, the mounting means being secured eccentrically to the worm wheel.

6. A machine tool as claimed in claim 5 wherein the cam is rotatable on the mounting means, locating means being provided to locate the cam with respect to the mounting means in a number of pre-determined positions.

7. A machine tool as claimed in claim 4 wherein a flexible drive means is attached at one end of the cam follower and is connectable at the other end to either the tool carriage drive means or the tool post drive means.

8. A machine tool as claimed in claim 7 wherein the flexible drive means includes step drive means connectable directly or indirectly to either the tool carriage drive means or the tool post drive means.

9. A machine tool as claimed in claim 8 wherein the step drive means comprises a sprag nut.

10. A machine tool as claimed in claim 1 wherein the rotatable carriage includes at least two arms upon which the tool carriage is axially moveable.

11. A machine tool as claimed in claim 1 wherein the power source to rotatably drive the rotatable carriage and to drive the tool post radially comprises a fluid motor.

12. A machine tool as claimed in claim 2 wherein the fluid motor is an air motor.

13. A machine tool as claimed in claim 2 wherein the motor is an hydraulic motor.

14. A machine tool as claimed in claim 11 wherein the power source for driving the tool carriage axially, and the tool post radially is a single power source selectively coupled to one of the tool carriage and the tool post.

15. A machine tool as claimed in claim 14 wherein the power source for driving the rotatable carriage rotatably, the tool carriage axially, and the tool post radially, is a single power source selectively coupled to one of the rotatable carriage, the tool carriage and the tool post.

16. A machine tool as claimed in claim 10 wherein the at least two arms of the rotatable carriage extend between end supports, the end supports being rotatably located in the mounting means.

17. A machine tool comprising a rotatable carriage rotatably located on mounting means, the mounting means enabling the machine tool to be positioned and secured relative to a work piece, the rotatable carriage supporting a tool carriage mounted for axial movement on the rotatable carriage relative to the axis of rotation of the rotatable carriage and a tool post mounted on the tool carriage for radial movement relative to the tool carriage, drive means for rotatably driving the rotatable carriage and for driving the tool carriage axially relative to the rotatable carriage, and for driving the tool post radially relative to the tool carriage, wherein the drive means for driving the tool post and for driving the tool carriage comprises a power source located remotely from the tool post and the tool carriage, and a drive transmission for coupling the power source to the tool post and to the tool carriage, said drive transmission including a variable rate drive having a worm wheel driven by the power source and a cam driven by the rotation of the worm wheel, a follower urged into contact with the cam, the follower operating an intermittent output drive selectively coupled to one of the tool carriage and the tool post.

18. A machine tool as claimed in claim 17, wherein the cam is located on and secured eccentrically on mounting means, the mounting means being secured eccentrically to the worm wheel.

19. A machine tool as claimed in claim 18, wherein the cam is rotatable on the mounting means, locating means being provided to locate the cam with respect to the mounting means in a number of pre-determined positions.

20. A machine tool as claimed in claim 17, wherein a flexible drive means is attached at one end of the cam follower and is connectable at the other end to either the tool carriage drive means or the tool post drive means.

21. A machine tool as claimed in claim 20, wherein the flexible drive means includes step drive means connectable directly or indirectly to either the tool carriage drive means or the tool post drive means.

22. A machine tool as claimed in claim 21, wherein the step drive means comprises a sprag nut.

* * * * *